(12) United States Patent
Sirotkin (10) Patent No.: US 9,525,538 B2
(45) Date of Patent: Dec. 20, 2016

(54) APPARATUS, SYSTEM AND METHOD OF COMMUNICATING NON-CELLULAR ACCESS NETWORK INFORMATION OVER A CELLULAR NETWORK

(71) Applicant: Alexander Sirotkin, Giv'on Hachadasha (IL)

(72) Inventor: Alexander Sirotkin, Giv'on Hachadasha (IL)

(73) Assignee: INTEL IP CORPORATION, Santa Clara, CA (US)

( * ) Notice: Subject to any disclaimer, the term of this patent is extended or adjusted under 35 U.S.C. 154(b) by 173 days.

(21) Appl. No.: 14/129,295

(22) PCT Filed: Oct. 14, 2013

(86) PCT No.: PCT/US2013/064761
§ 371 (c)(1),
(2) Date: Dec. 26, 2013

(87) PCT Pub. No.: WO2014/113103
PCT Pub. Date: Jul. 24, 2014

(65) Prior Publication Data
US 2015/0382281 A1     Dec. 31, 2015

Related U.S. Application Data

(60) Provisional application No. 61/753,914, filed on Jan. 17, 2013.

(51) Int. Cl.
*H04M 1/00* (2006.01)
*H04W 4/00* (2009.01)
(Continued)

(52) U.S. Cl.
CPC ............... *H04L 5/14* (2013.01); *H04B 7/0417* (2013.01); *H04B 7/0456* (2013.01); *H04J 3/00* (2013.01);
(Continued)

(58) Field of Classification Search
None
See application file for complete search history.

(56) References Cited

U.S. PATENT DOCUMENTS 7,212,837 B1    5/2007    Calhoun et al.
7,965,693 B2    6/2011    Jiang et al.
(Continued)

FOREIGN PATENT DOCUMENTS

CN    101167392 B    6/2012
EP    2389030         11/2011
(Continued)

OTHER PUBLICATIONS

International Preliminary Report on Patentability and Written Opinion for International Application No. PCT/US2013/064761, mailed on Jul. 30, 2015, 8 pages.
(Continued)

*Primary Examiner* — Erika Washington
(74) *Attorney, Agent, or Firm* — Shichrur & Co.

(57) ABSTRACT

Some demonstrative embodiments include devices, systems and/or methods of communicating non-cellular access network information via a cellular network. For example, an Evolved Node B (eNB) may include a radio to transmit a control message over a cellular communication medium, the control message including access network information of at least one non-cellular network within a coverage area of the eNB.

22 Claims, 3 Drawing Sheets

(51) Int. Cl.

| | |
|---|---|
| *H04L 5/14* | (2006.01) |
| *H04L 5/00* | (2006.01) |
| *H04B 7/04* | (2006.01) |
| *H04W 72/02* | (2009.01) |
| *H04L 29/06* | (2006.01) |
| *H04L 29/08* | (2006.01) |
| *H04W 36/22* | (2009.01) |
| *H04W 76/04* | (2009.01) |
| *H04W 16/32* | (2009.01) |
| *H04W 48/16* | (2009.01) |
| *H04W 72/04* | (2009.01) |
| *H04W 56/00* | (2009.01) |
| *H04L 5/22* | (2006.01) |
| *H04J 3/00* | (2006.01) |
| *H04W 74/00* | (2009.01) |
| *H04W 72/12* | (2009.01) |
| *H04W 72/00* | (2009.01) |
| *H04W 28/02* | (2009.01) |
| *H04W 52/02* | (2009.01) |
| *H04W 12/04* | (2009.01) |
| *H04W 76/02* | (2009.01) |
| *H04W 48/20* | (2009.01) |
| *H04W 24/02* | (2009.01) |
| *H04W 24/10* | (2009.01) |
| *H04L 1/18* | (2006.01) |
| *H04L 9/14* | (2006.01) |
| *H04W 8/00* | (2009.01) |
| *H04W 68/02* | (2009.01) |
| *H04W 4/06* | (2009.01) |
| *H04W 48/08* | (2009.01) |
| *H04W 88/06* | (2009.01) |
| *H04W 84/12* | (2009.01) |

(52) U.S. Cl.
CPC .......... *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/1469* (2013.01); *H04L 5/22* (2013.01); *H04L 9/14* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 12/04* (2013.01); *H04W 16/32* (2013.01); *H04W 24/02* (2013.01); *H04W 24/10* (2013.01); *H04W 28/0231* (2013.01); *H04W 36/22* (2013.01); *H04W 48/08* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/046* (2013.01); *H04W 72/0406* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 2209/24* (2013.01); *H04L 2209/80* (2013.01); *H04W 84/12* (2013.01)

(56) References Cited

U.S. PATENT DOCUMENTS

| | | |
|---|---|---|
| 8,112,087 B2 | 2/2012 | Jeong et al. |
| 8,467,351 B2 | 6/2013 | Liu et al. |
| 8,774,039 B2 | 7/2014 | Hirano et al. |
| 8,842,633 B2 | 9/2014 | Dwyer et al. |
| 8,918,096 B2 | 12/2014 | Drazynski et al. |
| 2004/0082327 A1 | 4/2004 | Kim et al. |
| 2004/0165563 A1 | 8/2004 | Hsu et al. |
| 2005/0153692 A1* | 7/2005 | Hwang ............... H04W 48/12 455/434 |
| 2005/0210154 A1 | 9/2005 | Verma et al. |
| 2005/0254469 A1 | 11/2005 | Verma et al. |
| 2005/0255851 A1 | 11/2005 | Schreiber |
| 2006/0018284 A1 | 1/2006 | Rudolf et al. |
| 2006/0189331 A1* | 8/2006 | Lundsjo ............... H04W 68/12 455/435.2 |
| 2006/0223567 A1 | 10/2006 | Kwak et al. |
| 2007/0097918 A1 | 5/2007 | Cai et al. |
| 2008/0207195 A1 | 8/2008 | Ranta et al. |
| 2010/0317315 A1 | 12/2010 | Burbidge et al. |
| 2010/0323698 A1 | 12/2010 | Rune et al. |
| 2011/0058531 A1 | 3/2011 | Jain et al. |
| 2011/0188472 A1 | 8/2011 | Jeon et al. |
| 2011/0222523 A1 | 9/2011 | Fu et al. |
| 2011/0306386 A1 | 12/2011 | Centoza et al. |
| 2012/0100853 A1 | 4/2012 | Xiong et al. |
| 2012/0113843 A1 | 5/2012 | Wafta et al. |
| 2012/0294215 A1 | 11/2012 | Ekici et al. |
| 2013/0083661 A1 | 4/2013 | Gupta et al. |
| 2013/0083722 A1 | 4/2013 | Bhargava et al. |
| 2013/0083783 A1 | 4/2013 | Gupta et al. |
| 2013/0163424 A1 | 6/2013 | Goerke et al. |
| 2013/0163463 A1 | 6/2013 | Grayson et al. |
| 2013/0242965 A1 | 9/2013 | Horn et al. |
| 2013/0250834 A1 | 9/2013 | Seok et al. |
| 2013/0308445 A1 | 11/2013 | Xiang et al. |
| 2013/0322238 A1 | 12/2013 | Sirotkin |
| 2014/0050086 A1 | 2/2014 | Himayat et al. |
| 2014/0112170 A1 | 4/2014 | Zhou et al. |
| 2014/0133294 A1 | 5/2014 | Horn et al. |
| 2014/0133304 A1 | 5/2014 | Pica et al. |
| 2014/0153511 A1 | 6/2014 | Sirotkin |
| 2014/0161103 A1 | 6/2014 | Sirotkin et al. |
| 2016/0014667 A1 | 1/2016 | Sirotkin et al. |
| 2016/0020890 A1 | 1/2016 | Sirotkin et al. |
| 2016/0142163 A1 | 5/2016 | Sirotkin |

FOREIGN PATENT DOCUMENTS

| | | |
|---|---|---|
| JP | 2005184824 | 7/2005 |
| JP | 201115327 | 1/2011 |
| KR | 20060084002 | 7/2006 |
| KR | 20110126913 | 11/2011 |
| KR | 20120005508 | 1/2012 |
| TW | 200723922 A | 6/2007 |
| TW | 201146046 A | 12/2011 |
| WO | 2008084621 | 7/2008 |
| WO | 2011110108 | 9/2011 |
| WO | 2012121757 | 9/2012 |

OTHER PUBLICATIONS

International Search Report and Written Opinion for PCT Patent Application No. PCT/US2013/064761, mailed on Jan. 20, 2014, 11 pages.

ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.

ETSI TS 136 331 V10.7.0 (Nov. 2012), LTE; Evolved Universal Terrestrial Radio Access (E-UTRA); Radio Resource Control (RRC); Protocol specification (3GPP TS 36.331 version 10.7.0 Release 10), 307 pages.

(56) References Cited

OTHER PUBLICATIONS

3GPP TSG-RAN Meeting #57, RP-1201455, "WLAN/3GPP Radio Interworking", Sep. 13-15, 2012, 5 pages.
3GPP TS 23.401 V10.7.0 (Mar. 2012), 3rd Generation Partnership Project; Technical Specification Group Services and System Aspects; General Packet Radio Service (GPRS) enhancements for Evolved Universal Terrestrial Radio Access Network (E-UTRAN) access (Release 10), 278 pages.
ETSI TS 136 413 V11.1.0 (Oct. 2012), LTE; Evolved Universal Terrestrial Radio Access Network (E-UTRAN); S1 Application Protocol (S1AP) (3GPP TS 36.413 version 11.1.0 Release 11), 270 pages.
3GPP TS 36.423 V11.0.0 (Mar. 2012), 3rd Generation Partnership Project; Technical Specification Group Radio Access Network; Evolved Universal Terrestrial Radio Access Network (E-UTRAN); X2 application protocol (X2AP) (Release 11), 134 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
Wi-Fi Alliance Technical Committee P2P Task Group; Wi-Fi Peer-to-Peer (P2P) Technical Specification; Version 1.2; Dec. 14, 2011; 160 pages.
3GPP RWS-120010, "Requirements, Candidate Solutions & Technology Roadmap for LTE Rel-12 Onward," NTT Docomo, Inc, Jun. 2012, 27 pages.
3GPP TSG RAN2 Meeting #81, R2-130887, "TR 37.8xx v0.1.0 on Study on WLAN/3GPP Radio Interworking", Feb. 2013, 9 pages.
3GPP TS 25.433 V11.1.0 (Jun. 2012), 3rd Generation Partnership Project; Technical Specification Group Radio Access Network; UTRAN Iub interface Node B Application Part (NBAP) signalling (Release 11), Jun. 2012, 1336 pages.
3GPP TS 25.331 V10.9.0 (Sep. 2012), 3rd Generation Partnership Project; Technical Specification Group Radio Access Network; Radio Resource Control (RRC); Protocol specification (Release 10), Sep. 2012, 1984 pages.
International Search Report and Written Opinion for PCT Patent Application No. PCT/US2013/077905, mailed on Feb. 28, 2014, 10 pages.
Office Action for U.S. Appl. No. 14/068,221, mailed on Jun. 2, 2015, 29 pages.
Office Action for U.S. Appl. No. 14/093,476, mailed on Jun. 8, 2015, 21 pages.
Office Action for Taiwanese Patent Application No. 103112548, mailed on May 25, 2015, 12 pages, including 1 page of English translation.
International Preliminary Report on Patentability for PCT/US2013/077905, mailed on Oct. 15, 2015, 7 pages.
Final Office Action for U.S. Appl. No. 14/093,476, mailed on Oct. 28, 2015, 33 pages.
3GPP TS 25.433, Universal Mobile Telecommunications System (UMTS); UTRAN Iub interface Node B Application Part (NBAP) Signaling, version 11.3.0 Release 11, Feb. 2013, 1328 pages.
3GPP TS 25.331: 3rd Generation Partnership Project; Technical Specification Group Radio Access Network; Radio Resource Control (RRC); Protocol specification (Release 10), V10.11.0, Mar. 2013, 1897 pages.
Office Action for Taiwanese Patent Application No. 103112288, mailed on Nov. 20, 2015, 19 pages, including 9 pages of English translation.
International Search Report and Written Opinion for PCT Patent Application No. PCT/US2013/077906, mailed on Feb. 28, 2014, 10 pages.
International Preliminary Report on Patentability for International Application No. PCT/US2013/077906, mailed on Oct. 15, 2015, 7 pages.
Office Action for U.S. Appl. No. 14/068,221, mailed on Dec. 22, 2015, 37 pages.
Notice of Allowance for U.S. Appl. No. 14/093,476, mailed on Mar. 28, 2016, 30 pages.
Office Action for Korean Patent Application Serial No. 2015-7015916, mailed on Mar. 24, 2016, 12 pages.(Including 6 pages of English translation.).
Office Action for Japanese Patent Application Serial No. 2015-547932, mailed on Aug. 9, 2016, 8 pages (Including 4 page of English translation.).
Search Report for European Patent Application No. 13881212.8 mailed on Sep. 15, 2016, 8 pages.
Huawei: "WLAN network selection enhancement", 3GPP Draft; R2-131366 WLAN Network Selection Enhancement, 3rd Generation Partnership Project (3GPP), Mobile Competence Centre; 650, Route Des Lucioles; F-06921 Sophia-Antipolis Cedex; France, vol. RAN WG2, no. Chicago, U.S.A.; 20130415-20130419, Apr. 5, 2013, 3 pages.
"Scenarios and Requirements on WLAN/3GPP Radio Interworking", 3GPP Draft; R2-130086 Scenarios and Requirements on WLAN 3GPP Radio Interworking, 3rd Generation, Partnership Project (3GPP), Mobile Competence Centre; 650, Route Des Lucioles; F-06921 Sophia Antipolis Cedex; France, Jan. 18, 2013, 4 pages.
"WLAN/3GPP Radio Interworking Scope and Scenarios", 3GPP Draft; R2-130264 WLAN Interworking Scenarios, 3rd Generation Partnership Project (3GPP), Mobile Competence Centre; 650, Route Des Lucioles; F-06921 Sophia Antipolis Cedex; France, Jan. 18, 2013, 3 pages.
Comparison of access network selection Solutions, 3GPP Draft; R2-132055 Comparison of Access Network Selection Solutions, 3rd Generation Partnership Project (3GPP), Mobile Competence Centre; 650, Route Des Lucioles; F-06921 Sophia Antipolis Cedex; vol. RAN WG2, no. Fukuoka, Japan; 20130520-20130524, May 11, 2013, 6 pages.
Office Action for Korean Patent Application No. 2015-7015916, mailed on Sep. 26, 2016, 7 pages (Including 3 pages of English translation).
Search Report for European Patent Application No. 13872198.0 mailed on Sep. 22, 2016, 10 pages.

* cited by examiner

APPARATUS, SYSTEM AND METHOD OF COMMUNICATING NON-CELLULAR ACCESS NETWORK INFORMATION OVER A CELLULAR NETWORK

CROSS REFERENCE

This application is a National Phase Application of PCT International Application No. PCT/US2013/064761, International Filing Date Oct. 14, 2013, which in turn claims the benefit of and priority from U.S. Provisional Patent application No. 61/753,914 entitled "Advanced Wireless Communication Systems and Techniques", filed Jan. 17, 2013, the entire disclosures of which are incorporated herein by reference.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

The UE may be configured to discover a WLAN based on access information pre-provisioned in the UE. However, the pre-provisioned information may not be efficient, for example, for dynamic networks, in which the access information may dynamically change.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "36.300-*Evolved Universal Terrestrial Radio Access (E-UTRA) and Evolved Universal Terrestrial Radio Access Network (E-UTRAN); Overall description; Stage* 2"; and "*RAN*2 *RRC*—3*GPP TS* 36.331: *Evolved Universal Terrestrial Radio Access (E-UTRA); Radio Resource Control (RRC); Protocol specification*") and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metro-* politan area networks—Specific requirements Part 11: Wireless LAN Medium Access Control (MAC) and Physical Layer (PHY) Specifications, Mar. 29, 2012), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), WiMax, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments are described herein with respect to a WLAN system. However, other embodiments may be implemented in any other suitable non-cellular network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Figure 1:
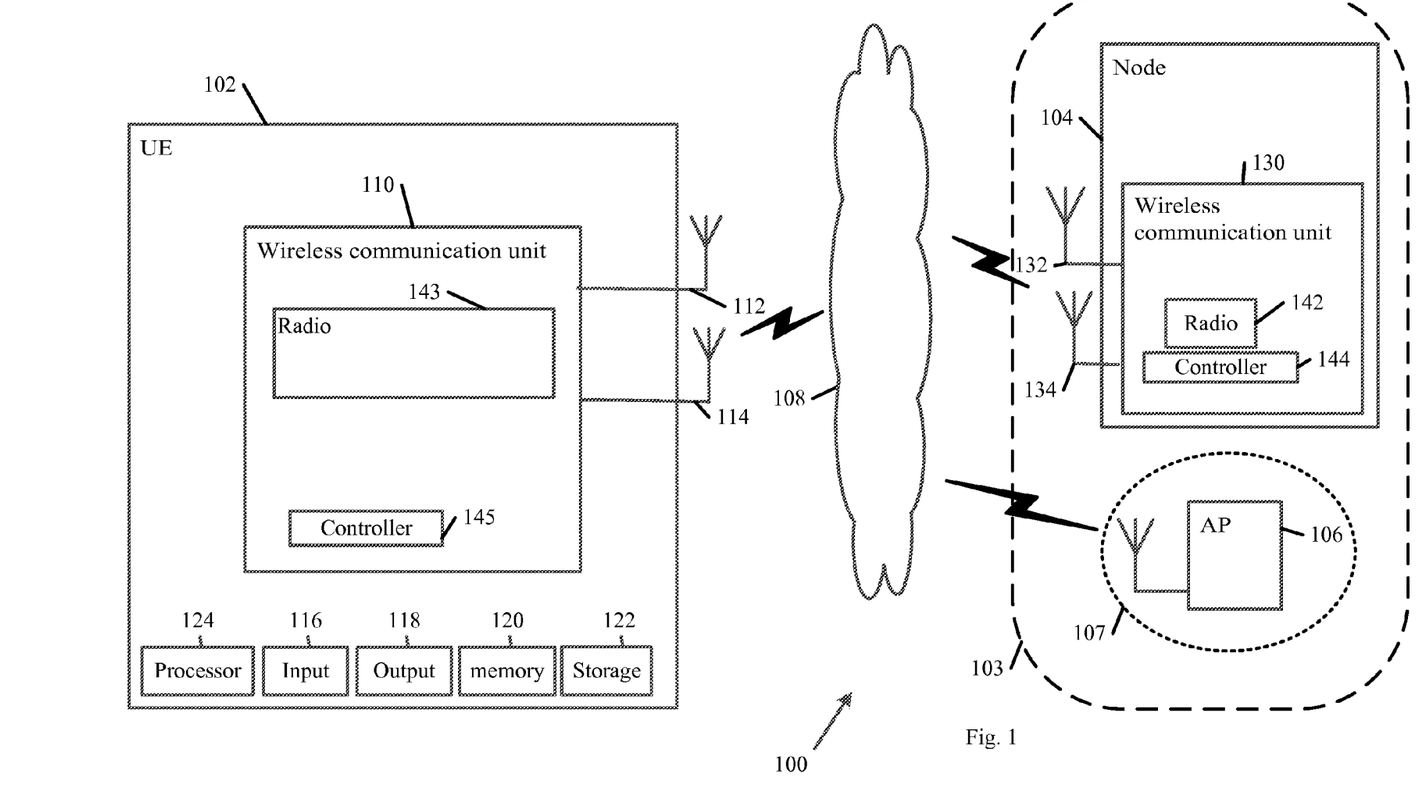
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network 103, e.g., a cell controlled by a node 104.

In some demonstrative embodiments, system 100 may include a non-cellular network 107, for example, a WLAN, e.g., a Basic Service Set (BSS), managed by an Access Point (AP) 106.

In some demonstrative embodiments, non-cellular network 107 may at least partially be within a coverage area of node 104. For example, AP 106 may be within a coverage area of node 104.

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB) or any other node or device.

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114; and/or wireless communication unit 130 may be associated with at least two antennas, e.g., antennas 132 and 134.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114,132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and at least one controller 144 to control communications performed by radio 142, and/or wireless communication unit 110 may include at least one radio 143 and at least one controller 145 to control communications performed by radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, radios 142 and/or 143 may include a multiple input multiple output (MIMO) transmitters receivers system (not shown), which may be capable of performing antenna beamforming methods, if desired.

In some demonstrative embodiments, radios 142 and/or 143 may include a turbo decoder and/or a turbo encoder (not shown) for encoding and/or decoding data bits into data symbols, if desired.

In some demonstrative embodiments, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104.

In some demonstrative embodiments, wireless communication unit 110 may establish a WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection or a Universal Mobile Telecommunications System (UMTS) connection, to communicate with node 104, and a WLAN connection, e.g., a Wireless-Fidelity (WiFi) connection, to communicate with AP 106.

In some demonstrative embodiments, UE 102 may be able to establish a connection with a non-cellular network, e.g., with AP 106 of network 107, after discovering access network information of the non-cellular network.

In some demonstrative embodiments, UE 102 may be able to access non-cellular network 107, for example, based on access network information corresponding to non-cellular network 107. For example, UE 102 may use WLAN access information for accessing the WLAN controlled by AP 106.

The phrase "access network information" as used herein with respect to a non-cellular network may include any information, which may be used by a device, e.g., UE 102, to discover, access and/or connect to the non-cellular network.

In one example, the access network information corresponding to the WLAN controlled by AP 106 may include an address of AP 106, a Service Set Identification (SSID) of AP 106, a Basic Service Set Identification (BSSID) of AP 106, a wireless communication frequency band for communicating with AP 106, a wireless communication frequency channel for communicating with AP 106, one or more attributes of a Physical Layer (PHY) of AP 106, security and/or authentication information corresponding to a secure WLAN connection, e.g., a WLAN security mode and/or WLAN security credentials, and/or any other information, for example, a Roaming Consortium, an Operator Friendly Name, a Network Access Identifier (NAI) Realm, a Domain Name, and the like.

In some demonstrative embodiments, the access network information of non-cellular networks, e.g., WLAN networks, may change, since, for example, deployments and/or configurations of the non-cellular networks, e.g., the WLAN networks, may change, e.g., frequently. Accordingly, static mechanisms for network discovery, e.g., pre-provisioning of WLAN access information in UE 102, may not be efficient and/or may not enable dynamic updating of the WLAN access information in UE 102.

In some demonstrative embodiments, using an Access Network Discovery and Selection Function (ANDSF) mechanism to provide the access network information of non-cellular network 107 to UE 102 may not be efficient and/or may not be adequate for some situations. For example, the overhead of the ANDSF mechanism may increase with the increase in the number and/or the rate of ANDSF messages being communicated, e.g., since the ANDSF mechanism may be based on high-level protocols, such as Open Mobile Alliance (OMA) Device Management (OMA-DM). Accordingly, the ANDSF mechanism may be sufficient for delivering information, which is not dynamic in nature, such as, for example, Inter-System Mobility Policies (ISMP) and/or Inter-System Routing Policies (ISRP). However, the ANDSF mechanism may not be efficient for delivering information, e.g., access network information, which may change frequently. Additionally, UE 102 may not be able to use the ANDSF mechanism when operating in an Idle mode, since the UE may be required to connect to an ANDSF entity in order to receive the access network information. Accordingly, delivering access network information to UE 102 via the ANDSF mechanism may require excessive use of the ANDSF mechanism, which may result in access and/or core network overload, and/or drainage of battery resources of UE 102.

In some demonstrative embodiments, node 104 may provide the access network information of non-cellular network 107 to UE 102, e.g., as described below.

In some demonstrative embodiments, node 104 may receive access network information of one or more non-cellular networks, e.g., including non-cellular network 107.

In some demonstrative embodiments, node 104 may also receive information relating to a location of the non-cellular networks, the coverage area of the non-cellular networks, a network load of the non-cellular networks and/or any other information relating to the non-cellular networks.

In some demonstrative embodiments, node 104 may receive the access network information and/or other information of the non-cellular networks from one or more sources and/or via one or more mechanisms, interfaces and/or connections.

For example, node 104 may receive the access network information and/or other information of the non-cellular networks via one or more internal interfaces between node 104 and controllers of the non-cellular networks, via one or more, e.g., proprietary and/or standardized, network interfaces between cellular network 103 and the non-cellular networks, and/or via any other interface.

In one example, node 104 may receive the access network information of non-cellular network 107 directly from AP 106.

In another example, node 104 may receive the access network information of non-cellular network 107 from another cellular or non-cellular node, which may communicate, directly or indirectly, with AP 106.

In some demonstrative embodiments, node 104 may deliver the access network information of non-cellular network 107 to UE 102, for example, when UE 102 is operating in a Connected mode, e.g., as described below.

In some demonstrative embodiments, node 104 may deliver the access network information of non-cellular network 107 to UE 102, for example, when UE 102 is operating in Idle mode, e.g., as described below.

In some demonstrative embodiments, node 104 may transmit a control message over a cellular communication medium, the control message including the access network information of non-cellular network 107, e.g., as described below.

In some demonstrative embodiments, UE 102 may receive the control message from node 104 and may communicate with non-cellular network 107, based on the non-cellular access network information.

For example, UE 102 may receive from node 104 a control message including access network information of the WLAN managed by AP 106, and UE 102 may communicate with AP 106 based on the access network information, e.g., to establish a connection with AP 106.

In some demonstrative embodiments, node 104 may broadcast the control message including the access network information of non-cellular network 107.

In some demonstrative embodiments, broadcasting the control message may enable a UE within the coverage are of node 104, e.g., UE 102, to discover the access network information of non-cellular network 107, for example, even if the UE is camped on a cell managed by node 104.

According to these embodiments, UE 102 may collect the access network information of one or more non-cellular networks, e.g., including non-cellular network 107, e.g., even while UE 102 operates in Idle mode.

In some demonstrative embodiments, UE 102 may use the access network information to later connect to a non-cellular network, e.g., the WLAN managed by AP 106.

In some demonstrative embodiments, UE 102 may be configured such that the access network information of non-cellular network 107, which is received from node 104, may supersede access network information of non-cellular network 107, which may be received from an ANDSF entity.

In some demonstrative embodiments, delivering the access network information of non-cellular network 107 as part of a control message broadcast by node 104 may be beneficial, e.g., compared to delivery of the access network information via the ANDSF mechanism.

For example, delivering the access network information of non-cellular network 107 as part of a control message broadcast by node 104 may enable UE 102 to receive the access network information of non-cellular network 107, even while UE is operating in Idle mode. Accordingly, the power consumption of UE 102 and, accordingly, the battery drainage of UE 102, may be reduced.

Additionally or alternatively, broadcasting the access network information of non-cellular network 107 as part of a control message broadcast by node 104 may conserve core network resources, e.g., compared to the ANDSF mechanism, which may require fetching of access network information from a centralized ANDSF node.

Additionally or alternatively, broadcasting the access network information of non-cellular network 107 as part of a control message broadcast by node 104 may shorten a scanning period for UE 102 to scan for and detect AP 106. Accordingly, the connection time for establishing a connection between UE 102 and AP 106 may be reduced.

Accordingly, broadcasting the access network information of non-cellular network 107 as part of a control message broadcast by node 104 may conserve the battery of UE 102.

In some demonstrative embodiments, node 104 may determine the access network information to be broadcast based on one or more criteria, e.g., time of day, network load and/or any other attribute.

In some demonstrative embodiments, node 104 may broadcast the access network information in the form of a list of WLAN AP entries, e.g., including an entry corresponding to AP 106. A WLAN AP entry may include access network information corresponding to the WLAN AP, e.g., including one or more of the following:

WLAN AP SSID;
WLAN AP BSSID;
WLAN AP channel number and/or frequency;
WLAN AP PHY type and/or capabilities;
Roaming Consortium;
Operator Friendly Name;
Network Access Identifier (NAI) Realm;
Domain Name; and/or
One or more other parameters.

In some demonstrative embodiments, node 104 may transmit the non-cellular access network information as part of at least one Radio-Resource-Control (RRC) signaling message.

In some demonstrative embodiments, node 104 may transmit the non-cellular access network information as part of at least one RRC System Information Block (SIB), e.g., as described below.

In some demonstrative embodiments, node 104 may broadcast one or more SIB messages including the non-cellular access network information of one or more non-cellular network. For example, the non-cellular network information may be included as part of at least one dedicated field of an SIB message.

In some demonstrative embodiments, the SIB message may include a dedicated SIB defined for communicating the non-cellular access network information.

In one demonstrative embodiment, the non-cellular access network information may be included as part of a dedicated SIB type 16 ("SIB 16"), or any other type. The SIB 16 may be defined, for example, to include information relevant for inter-Radio-Access-Technologies (inter-RAT) mobility and network selection/re-selection. For example, the SIB 16 may include information about WLAN neighboring access points, which may be relevant for re-selection to/from WLAN.

In one example, the SIB 16 may include the non-cellular access network information, e.g., as follows:

```
-- ASN1START
SystemInformationBlockType16 ::=      SEQUENCE {
    wlanAccessInformation             WLANAccessInformation
}
WLANAccessInformation ::= SEQUENCE{
    wlanSSID                          OCTET STRING(32)
    wlanBand                          ENUMERATED {b24, b5}
    wlanChannel                       INTEGER(0..255)
}
-- ASN1STOP
```

In other embodiments, the SIB may include the non-cellular access information in any other format, including any subset of the non-cellular access information parameters and/or any other additional non-cellular access information parameters.

In other embodiments, the non-cellular access network information may be included as part of any other SIB or any other Information Element (IE), for example, at least one dedicated field of a SIB type 8 ("SIB 8") IE.

In some demonstrative embodiments, node 104 may transmit the non-cellular access network information as part of a control message addressed to a UE.

For example, node 104 may transmit the access network information of the WLAN managed by AP 106 as part of a control message addressed to UE 102.

In some demonstrative embodiments, node 104 may transmit the control message addressed to the UE, for example, when the UE is operating in the Connected mode, e.g., when UE 102 is connected to node 104.

In some demonstrative embodiments, node 104 may transmit the non-cellular access network information to a particular UE, which is connected to node 104, e.g., UE 102, via a dedicated message, e.g., via dedicated RRC signaling, addressed to the UE.

In some demonstrative embodiments, node 104 may know the location of UE 102 with a relatively high degree of accuracy, e.g., when UE 102 is connected to node 104.

In some demonstrative embodiments, node 104 may be able to provide the non-cellular access network information to UE 102 in a protected manner, e.g., when UE 102 is connected to node 104. For example, node 104 may encrypt the non-cellular access network information, which is transmitted to UE 102.

In some demonstrative embodiments, the connection between UE 102 and node 104 may enable node 104 to provide to UE 102 security and/or authentication information corresponding to the non-cellular network.

For example, node 104 may provide to UE 102 the access network information of non-cellular network 107 including, for example, security and/or authentication information of the WLAN managed by AP 106.

In some demonstrative embodiments, node 104 may transmit the access network information to UE 102 in the form of a list of WLAN AP entries, e.g., including an entry corresponding to AP 106. A WLAN AP entry may include access network information corresponding to the WLAN AP, e.g., including one or more of the following:
  WLAN AP SSID;
  WLAN AP BSSID;
  WLAN AP channel number and/or frequency;
  Roaming Consortium;
  Operator Friendly Name;
  Network Access Identifier (NAI) Realm;
  Domain Name;
  WLAN AP PHY type and/or capabilities;
  WLAN security mode of the WLAN, e.g., Wired Equivalent Privacy (WEP), Wi-Fi Protected Access (WAP), WAP II (WAP2), and the like;
  WLAN security credentials of the WLAN, a WEP key, a WPA Pre-Shared Key (WPA-PSK), and the like; and/or
  One or more other parameters.

In some demonstrative embodiments, node 104 may transmit the non-cellular access network information to UE 102, for example, in response to a request from UE 102.

In one example, UE 102 may request the non-cellular access network information from node 104, e.g., periodically, when UE intends to establish a WLAN connection and/or at any other timing.

In some demonstrative embodiments, UE 102 may transmit the request to node 104 as part of an RRC signaling message, e.g., as part of a dedicated RRC signaling message.

In some demonstrative embodiments, node 104 may transmit (push) the non-cellular access network information to UE 102 in an unsolicited manner, e.g., even if a request from UE 102 is not received. For example, node 104 may transmit the non-cellular access network information to UE 102 periodically or according to any other timing scheme.

In one example, node 104 may transmit the non-cellular access network information to UE 102 upon network configuration changes, access network changes, e.g., changes in load, and/or based on any other criterion.

In some demonstrative embodiments, node 104 may transmit the non-cellular access network information of non-cellular network 107 as part of at least one RRC signaling message addressed to UE 102.

In some demonstrative embodiments, node 104 may transmit the non-cellular network access information of non-cellular network 107 as part of at least one dedicated message addressed to UE 102, e.g., as described below.

In some demonstrative embodiments, the non-cellular access network information of non-cellular network 107 may be included as part of a dedicated IE ("non-cellular access network information IE").

For example, WLAN access information of the WLAN managed by AP 106 may be included as part of a dedicated IE ("WLAN access information IE"), e.g., as follows:

```
-- ASN1START
WLANAccessInformation ::= SEQUENCE {
    wlanSSID            OCTET STRING(32)
    wlanBand            ENUMERATED {b24, b5}
    wlanChannel         INTEGER(0..255)
}
-- ASN1STOP
```

In one example, node 104 may transmit the non-cellular access network information IE as part of a MobilityFromEUTRACommand RRC message addressed to UE 102.

For example, the "MobilityFromEUTRACommand" message may be used to command handover or a cell change from Evolved Universal Terrestrial Radio Access (E-UTRA) to another Radio-Access-Technology (RAT), e.g., 3GPP or non-3GPP, or enhanced Circuit Switched (CS) fallback to CDMA2000 1xRTT. The "MobilityFromEUTRACommand" message may have the following attributes:
  Signaling Radio Bearer (SRB): SRB1;
  Radio Link Control (RLC) Service Access Point (SAP) (RLC-SAP): AM
  Logical channel: Dedicated Control Channel (DCCH);
  Direction: E-UTRAN to UE In one example, the "MobilityFromEUTRACommand" message may include the WLAN access information, e.g., as follows:

```
-- ASN1START
MobilityFromEUTRACommand ::=         SEQUENCE {
    rrc-TransactionIdentifier            RRC-TransactionIdentifier,
    criticalExtensions                   CHOICE {
        c1                                   CHOICE{
            mobilityFromEUTRACommand-r8          MobilityFromEUTRACommand-r8-IEs,
            mobilityFromEUTRACommand-r9          MobilityFromEUTRACommand-r9-IEs,
            mobilityFromEUTRACommand-r12 MobilityFromEUTRACommand-r12-IEs,
            spare1 NULL
        },
        criticalExtensionsFuture             SEQUENCE { }
    }
}
MobilityFromEUTRACommand-r8-IEs ::= SEQUENCE {
    cs-FallbackIndicator                 BOOLEAN,
    purpose                              CHOICE{
```

```
            handover                          Handover,
            cellChangeOrder                       CellChangeOrder
        },
        nonCriticalExtension              MobilityFromEUTRACommand-v8a0-IEs
OPTIONAL
}
MobilityFromEUTRACommand-v8a0-IEs ::= SEQUENCE {
        lateNonCriticalExtension          OCTET STRING                    OPTIONAL, -- Need
OP
        nonCriticalExtension              MobilityFromEUTRACommand-v8d0-IEs    OPTIONAL
}
MobilityFromEUTRACommand-v8d0-IEs ::= SEQUENCE {
        bandIndicator                     BandIndicatorGERAN              OPTIONAL, -- Cond
GERAN
        nonCriticalExtension              SEQUENCE {}                     OPTIONAL -- Need OP
}
MobilityFromEUTRACommand-r9-IEs ::= SEQUENCE {
        cs-FallbackIndicator              BOOLEAN,
        purpose                           CHOICE{
            handover                          Handover,
            cellChangeOrder                       CellChangeOrder,
            e-CSFB-r9                         E-CSFB-r9,
            ...
        },
        nonCriticalExtension              MobilityFromEUTRACommand-v930-IEs
OPTIONAL
}
MobilityFromEUTRACommand-v930-IEs ::= SEQUENCE {
        lateNonCriticalExtension          OCTET STRING                    OPTIONAL, -- Need
OP
        nonCriticalExtension              MobilityFromEUTRACommand-v960-IEs    OPTIONAL
}
MobilityFromEUTRACommand-v960-IEs ::= SEQUENCE {
        bandIndicator                     BandIndicatorGERAN              OPTIONAL, -- Cond
GERAN
        nonCriticalExtension              SEQUENCE { }                    OPTIONAL -- Need OP
}
Handover ::=                          SEQUENCE {
        targetRAT-Type                    ENUMERATED {
                                              utra, geran, cdma2000-1XRTT, cdma2000-HRPD,
                                              spare4, spare3, spare2, spare1, ...},
targetRAT-MessageContainer            OCTET STRING,
        nas-SecurityParamFromEUTRA        OCTET STRING (SIZE (1))         OPTIONAL, -- Cond
UTRAGERAN
        systemInformation                 SI-OrPSI-GERAN                  OPTIONAL -- Cond PSHO
}
CellChangeOrder ::=                   SEQUENCE {
        t304                              ENUMERATED {
                                              ms100, ms200, ms500, ms1000,
                                              ms2000, ms4000, ms8000, spare1},
        targetRAT-Type                    CHOICE {
                geran                         SEQUENCE {
                    physCellId                    PhysCellIdGERAN,
                    carrierFreq                       CarrierFreqGERAN,
                    networkControlOrder               BIT STRING (SIZE (2))    OPTIONAL, -
- Need OP
                    systemInformation             SI-OrPSI-GERAN              OPTIONAL -- Need
OP
                },
                ...
        }
}
SI-OrPSI-GERAN ::=                    CHOICE {
        si                                SystemInfoListGERAN,
        psi                               SystemInfoListGERAN
}
    E-CSFB-r9 ::=                         SEQUENCE {
    messageContCDMA2000-1XRTT-r9          OCTET STRING                    OPTIONAL, -- Need ON
    mobilityCDMA2000-HRPD-r9              ENUMERATED {
                                              handover, redirection
                                          }                               OPTIONAL, -- Need OP
    messageContCDMA2000-HRPD-r9           OCTET STRING                    OPTIONAL, -- Cond concHO
    redirectCarrierCDMA2000-HRPD-r9 CarrierFreqCDMA2000                   OPTIONAL -- Cond concRedir
```

-continued

```
}
MobilityFromEUTRACommand-r12-IEs ::= SEQUENCE {
    wlanAccessInformation         WLANAccessInformation              OPTIONAL,
    nonCriticalExtension          MobilityFromEUTRACommand-v930-IEs
    OPTIONAL
}
-- ASN1STOP
```

In another example, node 104 may transmit the non-cellular access network information IE as part of a DLInformationTransfer RRC message addressed to UE 102.

In another example, node 104 may transmit the non-cellular access network information IE as part of a RRCConnectionReconfiguration RRC message addressed to UE 102.

In another example, node 104 may transmit the non-cellular access network information IE as part of a HandoverFromEUTRAPreparationRequest RRC message addressed to UE 102.

In another example, node 104 may transmit the non-cellular access network information IE as part of a RRCConnectionRelease RRC message addressed to UE 102.

In another example, node 104 may transmit the non-cellular access network information IE as part of a RCConnectionReject RRC message addressed to UE 102.

In another example, node 104 may transmit the non-cellular access network information IE as part of another RRC message addressed to UE 102. For example, node 104 may transmit the non-cellular access network information IE as part of a dedicated RRC message defined for communicating the non-cellular access network information IE.

In other embodiments, the RRC message may include the non-cellular access information in any other format, including any subset of the non-cellular access information parameters and/or any other additional non-cellular access information parameters.

In other embodiments, the non-cellular access network information may be included as part of any other RRC signaling message or any other Information Element (IE).

Figure 2:
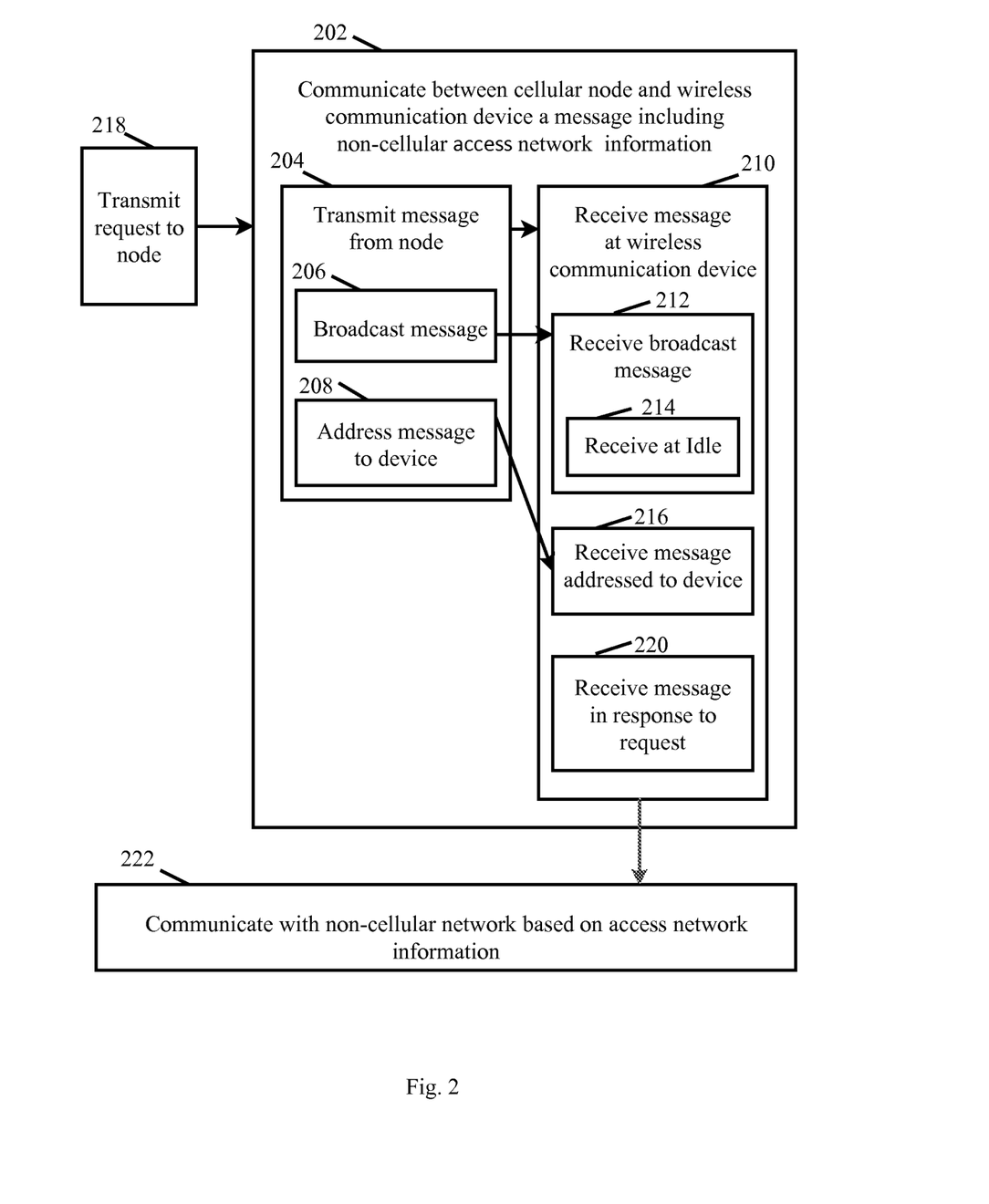
FIG. 2 is a schematic flow-chart illustration of a method of communicating non-cellular access network information via a cellular network, in accordance with some demonstrative embodiments.

Reference is made to FIG. 2, which schematically illustrates a method of communicating non-cellular access network information via a cellular network, in accordance with some demonstrative embodiments. In some embodiments, one or more of the operations of the method of FIG. 2 may be performed by a wireless communication system e.g., system 100 (FIG. 1); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 202, the method may include communicating between a cellular node and a wireless communication device at least one message including non-cellular access network information of at least one non-cellular network within a coverage area of the cellular node. For example, node 104 (FIG. 1) may communicate with UE 102 (FIG. 1) a message including access information of non-cellular network 107 (FIG. 1), e.g., as described above.

As indicated at block 204, communicating the message may include transmitting the message from the cellular node. For example, node 104 (FIG. 1) may transmit a control message including the non-cellular access network information, e.g., as described above.

As indicated at block 206, transmitting the message from the cellular node may include broadcasting the message. For example, node 104 (FIG. 1) may broadcast the control message including the non-cellular access network information, e.g., as described above.

As indicated at block 208, transmitting the message from the cellular node may include transmitting the message as a unicast or dedicated message addressed to the wireless communication device. For example, node 104 (FIG. 1) may transmit to UE 102 (FIG. 1) a control message addressed to UE 102 (FIG. 1), e.g., as described above.

As indicated at block 210, communicating the message may include receiving the message at the wireless communication device. For example, UE 102 (FIG. 1) may receive the control message transmitted by node 104 (FIG. 1), e.g., as described above.

As indicated at block 212, receiving the message at the wireless communication device may include receiving the broadcast message. For example, UE 102 (FIG. 1) may receive the broadcast control message from node 104 (FIG. 1), e.g., as described above.

As indicated at block 214, receiving the broadcast message may include receiving the broadcast message during idle operation of the wireless communication device. For example, UE 102 (FIG. 1) may receive the broadcast control message during Idle operation or during a connected mode of UE 102 (FIG. 1), e.g., as described above.

As indicated at block 216, receiving the message at the wireless communication device may include receiving the message addressed to the wireless communication device. For example, UE 102 (FIG. 1) may receive the dedicated control message addressed to UE 102 (FIG. 1), e.g., as described above.

As indicated at block 218, the method may include communicating a request message between the wireless communication device and the cellular node. For example, UE 102 (FIG. 1) may transmit a request to node 104 (FIG. 1) to request the non-cellular access network information of non-cellular network 107 (FIG. 1), e.g., as described above.

As indicated at block 220, receiving the message at the wireless communication device may include receiving the message in response to the request. For example, UE 102 (FIG. 1) may receive the non-cellular access network information of non-cellular network 107 (FIG. 1) from node 104 (FIG. 1) in response to the request, e.g., as described above.

As indicated at block 222, the method may include communicating between the wireless communication device and the non-cellular access network based on the non-cellular access network information. For example, UE 102 (FIG. 1) may establish a connection with AP 106 (FIG. 1) based on the WLAN access information received from node 104 (FIG. 1), e.g., as described above.

Figure 3:
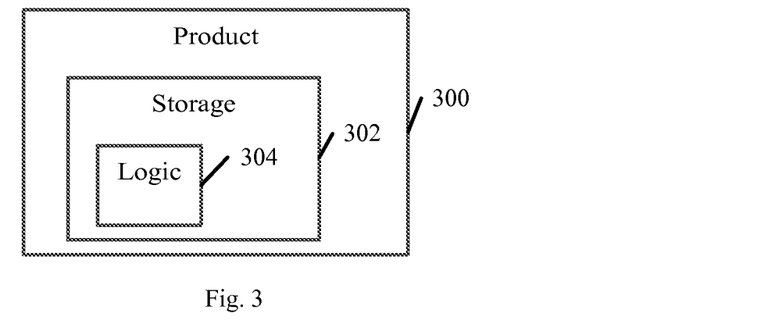
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1)

and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an Evolved Node B (eNB) comprising two or more antennas; and a radio to transmit a control message over a cellular communication medium, the control message including access network information of at least one non-cellular network within a coverage area of said eNB.

Example 2 includes the subject matter of Example 1, and optionally wherein said access network information comprises Wireless Local Area Network (WLAN) access information for accessing a WLAN.

Example 3 includes the subject matter of Example 2, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 4 includes the subject matter of any one of Examples 1-3, and optionally wherein said control message comprises a Radio-Resource Control (RRC) signaling message.

Example 5 includes the subject matter of any one of Examples 1-4, and optionally wherein said control message comprises a System Information Block (SIB) including said access network information.

Example 6 includes the subject matter of any one of Examples 1-5, and optionally wherein said radio is to transmit said control message addressed to a User Equipment (UE).

Example 7 includes the subject matter of Example 6, and optionally wherein said access network information comprises security information of a secure connection over said non-cellular network.

Example 8 includes the subject matter of Example 7, and optionally wherein said access network information comprises one or more information entries selected from the group consisting of a Wireless Local Area Network (WLAN) security mode of said secure connection, and WLAN security credentials of said secure connection.

Example 9 includes the subject matter of any one of Examples 1-5, and optionally wherein said radio is to broadcast said control message over said cellular communication medium.

Example 10 includes a User Equipment (UE) comprising a radio to receive from an Evolved Node B (eNB) a message including access network information for accessing at least one non-cellular network, and based on said access network information to communicate with said non-cellular network.

Example 11 includes the subject matter of Example 10, and optionally wherein said access network information comprises Wireless Local Area Network (WLAN) access information for accessing a WLAN.

Example 12 includes the subject matter of Example 11, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, WLAN frequency band used by said WLAN AP, a WLAN channel used by said WLAN AP, and one or more attributes of a Physical Layer (PHY) of said WLAN AP.

Example 13 includes the subject matter of any one of Examples 10-12, and optionally wherein said message comprises a Radio-Resource Control (RRC) signaling message.

Example 14 includes the subject matter of any one of Examples 10-13, and optionally wherein said message comprises a System Information Block (SIB) including said access network information.

Example 15 includes the subject matter of any one of Examples 10-14, and optionally wherein said radio is to receive said message during idle or connected operation of said UE, said message including a broadcast message.

Example 16 includes the subject matter of any one of Examples 10-14, and optionally wherein said message comprises a dedicated message addressed to said UE.

Example 17 includes the subject matter of Example 16, and optionally wherein said access network information comprises security information of a secure connection over said non-cellular network.

Example 18 includes the subject matter of Example 17, and optionally wherein said access network information comprises one or more information entries selected from the group consisting of a Wireless Local Area Network (WLAN) security mode of said secure connection, and WLAN security credentials of said secure connection.

Example 19 includes the subject matter of any one of Examples 16-18, and optionally wherein said radio is to transmit a request to said eNB and to receive said message in response to said request.

Example 20 includes a method comprising communicating between an Evolved Node B (eNB) and a User Equipment (UE) at least one message including Wireless Local Are Network (WLAN) access information of at least one WLAN within a coverage area of said eNB.

Example 21 includes the subject matter of Example 20, and optionally wherein communicating said message comprises receiving said message at said UE.

Example 22 includes the subject matter of Example 21, and optionally wherein receiving said message comprises receiving said message during idle operation of said UE, said message including a broadcast message.

Example 23 includes the subject matter of Example 21, and optionally wherein receiving said message comprises receiving a broadcast message.

Example 24 includes the subject matter of Example 21, and optionally wherein receiving said message comprises receiving said message addressed to said UE.

Example 25 includes the subject matter of Example 24, and optionally wherein said WLAN access information comprises security information of a secure connection over said WLAN.

Example 26 includes the subject matter of Example 25, and optionally wherein said WLAN comprises one or more information entries selected from the group consisting of a WLAN security mode of said secure connection, and WLAN security credentials of said secure connection.

Example 27 includes the subject matter of any one of Examples 21-26, and optionally comprising communicating with said non-cellular network based on said access network information.

Example 28 includes the subject matter of Example 20, and optionally wherein communicating said message comprises transmitting said message from said eNB.

Example 29 includes the subject matter of Example 28, and optionally wherein transmitting said message comprises broadcasting said message.

Example 30 includes the subject matter of Example 28, and optionally wherein transmitting said message comprises transmitting said message addressed to said UE.

Example 31 includes the subject matter of Example 30, and optionally wherein said WLAN access information comprises security information of a secure connection over said WLAN.

Example 32 includes the subject matter of Example 31, and optionally wherein said WLAN access information comprises one or more information entries selected from the group consisting of a WLAN security mode of said secure connection, and WLAN security credentials of said secure connection.

Example 33 includes the subject matter of any one of Examples 20-32, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 34 includes the subject matter of any one of Examples 20-33, and optionally wherein said message comprises a Radio-Resource Control (RRC) signaling message.

Example 35 includes the subject matter of any one of Examples 20-34, and optionally wherein said message comprises a System Information Block (SIB) including said WLAN access information.

Example 36 includes product including a non-transitory storage medium having stored thereon instructions that, when executed by a machine, result in communicating between an Evolved Node B (eNB) and a User Equipment (UE) at least one message including Wireless Local Are Network (WLAN) access information of at least one WLAN within a coverage area of said eNB.

Example 37 includes the subject matter of Example 36, and optionally wherein communicating said message comprises receiving said message at said UE.

Example 38 includes the subject matter of Example 37, and optionally wherein receiving said message comprises receiving said message during idle or connected operation of said UE, said message including a broadcast message.

Example 39 includes the subject matter of Example 37, and optionally wherein receiving said message comprises receiving a broadcast message.

Example 40 includes the subject matter of Example 37, and optionally wherein receiving said message comprises receiving said message addressed to said UE.

Example 41 includes the subject matter of Example 40, and optionally wherein said WLAN access information comprises security information of a secure connection over said WLAN.

Example 42 includes the subject matter of Example 41, and optionally wherein said WLAN comprises one or more information entries selected from the group consisting of a WLAN security mode of said secure connection, and WLAN security credentials of said secure connection.

Example 43 includes the subject matter of any one of Examples 37-42, and optionally wherein said instructions result in communicating with said non-cellular network based on said access network information.

Example 44 includes the subject matter of Example 36, and optionally wherein communicating said message comprises transmitting said message from said eNB.

Example 45 includes the subject matter of Example 44, and optionally wherein transmitting said message comprises broadcasting said message.

Example 46 includes the subject matter of Example 44, and optionally wherein transmitting said message comprises transmitting said message addressed to said UE.

Example 47 includes the subject matter of Example 46, and optionally wherein said WLAN access information comprises security information of a secure connection over said WLAN.

Example 48 includes the subject matter of Example 47, and optionally wherein said WLAN access information comprises one or more information entries selected from the group consisting of a WLAN security mode of said secure connection, and WLAN security credentials of said secure connection.

Example 49 includes the subject matter of any one of Examples 36-48, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 50 includes the subject matter of any one of Examples 36-49, and optionally wherein said message comprises a Radio-Resource Control (RRC) signaling message.

Example 51 includes the subject matter of any one of Examples 36-50, and optionally wherein said message comprises a System Information Block (SIB) including said WLAN access information.

Example 52 includes apparatus comprising means for communicating between an Evolved Node B (eNB) and a User Equipment (UE) at least one message including non-cellular access network information of at least one non-cellular network within a coverage area of said eNB.

Example 53 includes the subject matter of Example 52, and optionally wherein communicating said message comprises receiving said message at said UE.

Example 54 includes the subject matter of Example 53, and optionally wherein receiving said message comprises receiving said message during idle or connected operation of said UE, said message including a broadcast message.

Example 55 includes the subject matter of Example 53, and optionally wherein receiving said message comprises receiving a broadcast message.

Example 56 includes the subject matter of Example 53, and optionally wherein receiving said message comprises receiving said message addressed to said UE.

Example 57 includes the subject matter of Example 56, and optionally wherein said non-cellular access network information comprises security information of a secure connection over said non-cellular network.

Example 58 includes the subject matter of Example 57, and optionally wherein said non-cellular access network information comprises one or more information entries selected from the group consisting of a security mode of said secure connection, and security credentials of said secure connection.

Example 59 includes the subject matter of any one of Examples 53-58, and optionally comprising means for communicating with said non-cellular network based on said access network information.

Example 60 includes the subject matter of Example 52, and optionally wherein communicating said message comprises transmitting said message from said eNB.

Example 61 includes the subject matter of Example 60, and optionally wherein transmitting said message comprises broadcasting said message.

Example 62 includes the subject matter of Example 60, and optionally wherein transmitting said message comprises transmitting said message addressed to said UE.

Example 63 includes the subject matter of Example 62, and optionally wherein said non-cellular access network information comprises security information of a secure connection over said non-cellular network.

Example 64 includes the subject matter of Example 63, and optionally wherein said non-cellular access network information comprises one or more information entries selected from the group consisting of a security mode of said secure connection, and security credentials of said secure connection.

Example 65 includes the subject matter of any one of Examples 52-64, and optionally wherein said non-cellular network comprises a Wireless Local Area Network (WLAN).

Example 66 includes the subject matter of Example 65, and optionally wherein said non-cellular access network information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 67 includes the subject matter of any one of Examples 52-66, and optionally wherein said message comprises a Radio-Resource Control (RRC) signaling message.

Example 68 includes the subject matter of any one of Examples 52-67, and optionally wherein said message comprises a System Information Block (SIB) including said non-cellular access network information.

Example 69 includes cellular node comprising one or more antennas; and a radio to transmit a control message over a cellular communication medium, the control message including access network information of at least one non-cellular network within a coverage area of said cellular node.

Example 70 includes the subject matter of Example 69, and optionally wherein said access network information comprises Wireless Local Area Network (WLAN) access information for accessing a WLAN.

Example 71 includes the subject matter of Example 70, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 72 includes the subject matter of any one of Examples 69-71, and optionally wherein said control message comprises a Radio-Resource Control (RRC) signaling message.

Example 73 includes the subject matter of any one of Examples 69-72, and optionally wherein said control message comprises a System Information Block (SIB) including said access network information.

Example 74 includes the subject matter of any one of Examples 69-73, and optionally wherein said radio is to transmit said control message addressed to a User Equipment (UE).

Example 75 includes the subject matter of Example 74, and optionally wherein said access network information comprises security information of a secure connection over said non-cellular network.

Example 76 includes the subject matter of Example 75, and optionally wherein said access network information comprises one or more information entries selected from the group consisting of a Wireless Local Area Network (WLAN) security mode of said secure connection, and WLAN security credentials of said secure connection.

Example 77 includes the subject matter of any one of Examples 69-73, and optionally wherein said radio is to broadcast said control message over said cellular communication medium.

Example 78 includes the subject matter of any one of Examples 69-77, and optionally comprising an Evolved Node B (eNB).

Example 79 includes wireless communication device comprising a radio to receive from a cellular node a message including access network information for accessing at least one non-cellular network, and based on said access network information to communicate with said non-cellular network.

Example 80 includes the subject matter of Example 79, and optionally wherein said access network information comprises Wireless Local Area Network (WLAN) access information for accessing a WLAN.

Example 81 includes the subject matter of Example 80, and optionally wherein said WLAN access information comprises one or more information entries selected from the group consisting of a WLAN Access Point (AP) Service Set Identification (SSID) of a WLAN AP, a WLAN AP Basic Service set identification (BSSID) of said WLAN AP, a Roaming Consortium of said WLAN AP, an Operator Friendly Name of said WLAN AP, a Network Access Identifier (NAI) Realm of said WLAN AP, a Domain Name of said AP, a WLAN frequency band used by said WLAN AP, a WLAN channel used by said WLAN AP, and one or more attributes of a Physical Layer (PHY) of said WLAN AP.

Example 82 includes the subject matter of any one of Examples 79-81, and optionally wherein said message comprises a Radio-Resource Control (RRC) signaling message.

Example 83 includes the subject matter of any one of Examples 79-82, and optionally wherein said message comprises a System Information Block (SIB) including said access network information.

Example 84 includes the subject matter of any one of Examples 79-83, and optionally wherein said radio is to receive said message during idle or connected operation of said wireless communication device, said message including a broadcast message.

Example 85 includes the subject matter of any one of Examples 79-84, and optionally wherein said message comprises a dedicated message addressed to said wireless communication device.

Example 86 includes the subject matter of Example 85, and optionally wherein said access network information comprises security information of a secure connection over said non-cellular network.

Example 87 includes the subject matter of Example 86, and optionally wherein said access network information comprises one or more information entries selected from the group consisting of a Wireless Local Area Network (WLAN) security mode of said secure connection, and WLAN security credentials of said secure connection.

Example 88 includes the subject matter of any one of Examples 85-87, and optionally wherein said radio is to transmit a request to said cellular node and to receive said message in response to said request.

Example 89 includes the subject matter of any one of Examples 79-88, and optionally comprising a User Equipment (UE).

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A user equipment (UE) comprising:
a wireless receiver to receive, in a radio transmission of an evolved NodeB (eNB) of a long term evolution (LTE) network, a message that includes a system information block (SIB) that includes access network information related to a wireless local area network (WLAN), wherein the access network information includes a service set identifier (SSID) of an access point (AP) of the WLAN or a basic SSID (BSSID) of the AP, the access network information includes security information related to a secure connection of the WLAN; and
a controller coupled with the wireless receiver, the controller to identify, based on the message, that the UE is to connect to the WLAN AP.

2. The UE of claim 1, wherein the message is a radio resource control (RRC) message.

3. The UE of claim 1, wherein the wireless receiver is to receive the message when the UE is in an idle mode.

4. The UE of claim 1, further comprising a wireless transmitter coupled with the controller, the wireless transmitter to transmit an access request to the WLAN AP based on the access network information.

5. The UE of claim 1, wherein the access network information includes information related to a security mode of the WLAN or security credentials of the WLAN.

6. An evolved NodeB (eNB) comprising:
a controller to identify access network information of a wireless local area network (WLAN) that includes a service set identifier (SSID) of an access point (AP) of the WLAN or a basic SSID (BSSID) of the AP, the access network information includes security information related to a secure connection of the WLAN; and
a wireless transmitter coupled with the controller, the wireless transmitter to transmit a message that includes a system information block (SIB) that includes the access network information.

7. The eNB of claim 6, wherein the wireless transmitter is to transmit the message to a user equipment (UE) when the UE is in an idle mode.

8. The eNB of claim 7, wherein the message includes an identifier of the UE.

9. The eNB of claim 6, wherein the access network information includes information related to a security mode of the WLAN or security credentials of the WLAN.

10. One or more non-transitory computer-readable media comprising instructions to cause a user equipment (UE), upon execution of the instructions by one or more processors of the UE, to:
   identify, from a radio transmission of an evolved NodeB (eNB) of a long term evolution (LTE) network, a system information block (SIB) that includes access network information of a wireless local area network (WLAN), wherein the access network information includes a service set identifier (SSID) of an access point (AP) of the WLAN or a basic SSID (BSSID) of the AP, the access network information includes security information related to a secure connection of the WLAN; and
   identify, based on the SIB, that the UE is to connect to the WLAN.

11. The one or more non-transitory computer-readable media of claim 10, wherein the radio transmission is a broadcast transmission of the eNB.

12. The one or more non-transitory computer-readable media of claim 10, wherein the instructions are further to facilitate transmission of an access request to the WLAN AP based on the access network information.

13. The one or more non-transitory computer-readable media of claim 10, wherein the access network information includes information related to a security mode of the WLAN or security credentials of the WLAN.

14. A method comprising:
   generating, by an evolved NodeB (eNB), a radio resource control (RRC) message that includes a system information block (SIB) that includes access network information of a wireless local area network (WLAN), wherein the access network information includes a service set identifier (SSID) of an access point (AP) of the WLAN or a basic SSID (BSSID) of the AP, the access network information includes security information related to a secure connection of the WLAN; and
   transmitting, by the eNB, the RRC message in a wireless signal of a long term evolution (LTE) network.

15. The method of claim 14, further comprising transmitting, by the eNB, the RRC message to a user equipment (UE) when the UE is in an idle mode.

16. The method of claim 15, wherein the RRC message includes an identifier of the UE.

17. The method of claim 14, wherein the access network information includes information related to a security mode of the WLAN or security credentials of the WLAN.

18. One or more non-transitory computer-readable media comprising instructions to cause an evolved NodeB (eNB), upon execution of the instructions by one or more processors of the eNB, to:
   generate a radio resource control (RRC) message that includes a system information block (SIB) that includes access network information of a wireless local area network (WLAN), wherein the access network information includes a service set identifier (SSID) of an access point (AP) of the WLAN or a basic SSID (BSSID) of the AP, the access network information includes security information related to a secure connection of the WLAN; and
   facilitate transmission of the RRC message in a wireless signal of a long term evolution (LTE) network.

19. The one or more non-transitory computer-readable media of claim 18, wherein the instructions are further to transmit the RRC message to a user equipment (UE) when the UE is in an idle mode.

20. The one or more non-transitory computer-readable media of claim 19, wherein the RRC message includes an identifier of the UE.

21. The one or more non-transitory computer-readable media of claim 18, wherein the access network information includes security information related to a security mode of the WLAN or security credentials of the WLAN.

22. The one or more non-transitory computer-readable media of claim 18, wherein the transmission is a broadcast transmission.

* * * * *

UNITED STATES PATENT AND TRADEMARK OFFICE
CERTIFICATE OF CORRECTION

| | |
|---|---|
| PATENT NO. | : 9,525,538 B2 |
| APPLICATION NO. | : 14/129295 |
| DATED | : December 20, 2016 |
| INVENTOR(S) | : Alexander Sirotkin |

Page 1 of 1

It is certified that error appears in the above-identified patent and that said Letters Patent is hereby corrected as shown below:

In the Claims

In Column 26, Line 35, in Claim 21, delete "includes security information" and insert -- includes information --, therefor.

Signed and Sealed this
Second Day of May, 2017

Michelle K. Lee
*Director of the United States Patent and Trademark Office*